(12) United States Patent
Abreu et al.

(10) Patent No.: US 12,250,654 B2
(45) Date of Patent: Mar. 11, 2025

(54) CLOCK SYNCHRONIZATION

(71) Applicant: NOKIA TECHNOLOGIES OY, Espoo (FI)

(72) Inventors: Renato Barbosa Abreu, Aalborg (DK); Thomas Haaning Jacobsen, Nørresundby (DK); Troels Emil Kolding, Klarup (DK); Dawid Koziol, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 136 days.

(21) Appl. No.: 17/682,838

(22) Filed: Feb. 28, 2022

(65) Prior Publication Data

US 2022/0286991 A1   Sep. 8, 2022

(30) Foreign Application Priority Data

Mar. 1, 2021   (FI) ..................................... 20215222

(51) Int. Cl.
 *H04W 56/00* (2009.01)
(52) U.S. Cl.
 CPC ..... *H04W 56/0055* (2013.01); *H04W 56/004* (2013.01)
(58) Field of Classification Search
 CPC .................... H04W 56/0055; H04W 88/00–06
 See application file for complete search history.

(56) References Cited

U.S. PATENT DOCUMENTS

| | | | |
|---|---|---|---|
| 2011/0158164 A1* | 6/2011 | Palanki | H04W 74/04 370/328 |
| 2013/0344878 A1 | 12/2013 | Whinnett | |
| 2014/0051426 A1* | 2/2014 | Siomina | H04W 48/16 455/422.1 |
| 2015/0195674 A1* | 7/2015 | Opshaug | G01S 5/02 455/456.6 |
| 2015/0256972 A1* | 9/2015 | Markhovsky | G01S 5/0273 455/456.1 |
| 2016/0192304 A1 | 6/2016 | Yi et al. | |
| 2016/0302165 A1 | 10/2016 | Da et al. | |
| 2017/0078985 A1 | 3/2017 | Zheng et al. | |

(Continued)

FOREIGN PATENT DOCUMENTS

WO   WO 2020/167013 A1   8/2020
WO   2020192784 A1   10/2020

OTHER PUBLICATIONS

Office Action and Search Report dated Sep. 10, 2021 corresponding to Finnish Patent Application No. 20215222.

(Continued)

*Primary Examiner* — San Htun
(74) *Attorney, Agent, or Firm* — SQUIRE PATTON BOGGS (US) LLP

(57) ABSTRACT

Disclosed is a method comprising estimating a time synchronization accuracy associated with a plurality of base stations comprising at least a first base station and a second base station based at least partly on one or more uncertainty factors determined by the terminal device, selecting the second base station from the plurality of base stations by comparing the estimated time synchronization accuracy associated with the plurality of base stations, and synchronizing a clock based on the selected second base station.

7 Claims, 8 Drawing Sheets

(56) References Cited

U.S. PATENT DOCUMENTS

2018/0167900 A1    6/2018  Wang et al.
2020/0229124 A1*   7/2020  Soriaga .............. H04L 43/0864
2022/0182165 A1*   6/2022  Sha .................... H04J 3/0685

OTHER PUBLICATIONS

A. Mahmood et al., "Time Synchronization in 5G Wireless Edge: Requirements and Solutions for Critical MTC," In: IEEE Communications Magazine, Dec. 2019, pp. 45-51.
Partial Search Report dated Jul. 2, 2022, corresponding to European Patent Application No. 22157882.6.
Extended European Search Report dated Oct. 26, 2022, corresponding to European Patent Application No. 22157882.6.

\* cited by examiner

CLOCK SYNCHRONIZATION

FIELD

The following exemplary embodiments relate to wireless communication.

BACKGROUND

As resources are limited, it is desirable to optimize the usage of network resources. Accurate time synchronization in a terminal device may enable better usage of resources and enhanced user experience to a user of the terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: estimate a time synchronization accuracy associated with a plurality of base stations comprising at least a first base station and a second base station, wherein the time synchronization accuracy is estimated based at least partly on one or more uncertainty factors determined by the apparatus; select the second base station from the plurality of base stations by comparing the estimated time synchronization accuracy associated with the plurality of base stations, wherein the estimated time synchronization accuracy associated with the second base station is higher than the estimated time synchronization accuracy associated with the first base station; and synchronize a clock based on the selected second base station.

According to another aspect, there is provided an apparatus comprising means for: estimating a time synchronization accuracy associated with a plurality of base stations comprising at least a first base station and a second base station, wherein the time synchronization accuracy is estimated based at least partly on one or more uncertainty factors determined by the apparatus; selecting the second base station from the plurality of base stations by comparing the estimated time synchronization accuracy associated with the plurality of base stations, wherein the estimated time synchronization accuracy associated with the second base station is higher than the estimated time synchronization accuracy associated with the first base station; and synchronizing a clock based on the selected second base station.

According to another aspect, there is provided a method comprising estimating, by a terminal device, a time synchronization accuracy associated with a plurality of base stations comprising at least a first base station and a second base station, wherein the time synchronization accuracy is estimated based at least partly on one or more uncertainty factors determined by the terminal device; selecting, by the terminal device, the second base station from the plurality of base stations by comparing the estimated time synchronization accuracy associated with the plurality of base stations, wherein the estimated time synchronization accuracy associated with the second base station is higher than the estimated time synchronization accuracy associated with the first base station; and synchronizing, by the terminal device, a clock based on the selected second base station.

According to another aspect, there is provided a computer program comprising instructions for causing an apparatus to perform at least the following: estimate a time synchronization accuracy associated with a plurality of base stations comprising at least a first base station and a second base station, wherein the time synchronization accuracy is estimated based at least partly on one or more uncertainty factors determined by the apparatus; select the second base station from the plurality of base stations by comparing the estimated time synchronization accuracy associated with the plurality of base stations, wherein the estimated time synchronization accuracy associated with the second base station is higher than the estimated time synchronization accuracy associated with the first base station; and synchronize a clock based on the selected second base station.

According to another aspect, there is provided a computer readable medium comprising program instructions for causing an apparatus to perform at least the following: estimate a time synchronization accuracy associated with a plurality of base stations comprising at least a first base station and a second base station, wherein the time synchronization accuracy is estimated based at least partly on one or more uncertainty factors determined by the apparatus; select the second base station from the plurality of base stations by comparing the estimated time synchronization accuracy associated with the plurality of base stations, wherein the estimated time synchronization accuracy associated with the second base station is higher than the estimated time synchronization accuracy associated with the first base station; and synchronize a clock based on the selected second base station.

According to another aspect, there is provided a non-transitory computer readable medium comprising program instructions for causing an apparatus to perform at least the following: estimate a time synchronization accuracy associated with a plurality of base stations comprising at least a first base station and a second base station, wherein the time synchronization accuracy is estimated based at least partly on one or more uncertainty factors determined by the apparatus; select the second base station from the plurality of base stations by comparing the estimated time synchronization accuracy associated with the plurality of base stations, wherein the estimated time synchronization accuracy associated with the second base station is higher than the estimated time synchronization accuracy associated with the first base station; and synchronize a clock based on the selected second base station.

According to another aspect, there is provided an apparatus comprising at least one processor, and at least one memory including computer program code, wherein the at least one memory and the computer program code are configured, with the at least one processor, to cause the apparatus to: obtain a first set of uncertainty values from one or more second base stations, wherein the first set of uncertainty values indicates, at least partly, a time synchronization accuracy associated with the one or more second base stations; select at least a subset of the one or more second base stations based at least partly on the first set of uncertainty values; and instruct the at least subset of the one or more second base stations to provide at least a subset of the first set of uncertainty values to a terminal device.

According to another aspect, there is provided an apparatus comprising means for: obtaining a first set of uncertainty values from one or more second base stations, wherein the first set of uncertainty values indicates, at least partly, a time synchronization accuracy associated with the one or more second base stations; selecting at least a subset of the one or more second base stations based at least partly on the first set of uncertainty values; and instructing the at least subset of the one or more second base stations to provide at least a subset of the first set of uncertainty values to a terminal device.

According to another aspect, there is provided a method comprising obtaining, by a first base station, a first set of uncertainty values from one or more second base stations, wherein the first set of uncertainty values indicates, at least partly, a time synchronization accuracy associated with the one or more second base stations; selecting, by the first base station, at least a subset of the one or more second base stations based at least partly on the first set of uncertainty values; and instructing, by the first base station, the at least subset of the one or more second base stations to provide at least a subset of the first set of uncertainty values to a terminal device.

According to another aspect, there is provided a computer program comprising instructions for causing an apparatus comprised in a first base station to perform at least the following: obtain a first set of uncertainty values from one or more second base stations, wherein the first set of uncertainty values indicates, at least partly, a time synchronization accuracy associated with the one or more second base stations; select at least a subset of the one or more second base stations based at least partly on the first set of uncertainty values; and instruct the at least subset of the one or more second base stations to provide at least a subset of the first set of uncertainty values to a terminal device.

According to another aspect, there is provided a computer readable medium comprising program instructions for causing an apparatus comprised in a first base station to perform at least the following: obtain a first set of uncertainty values from one or more second base stations, wherein the first set of uncertainty values indicates, at least partly, a time synchronization accuracy associated with the one or more second base stations; select at least a subset of the one or more second base stations based at least partly on the first set of uncertainty values; and instruct the at least subset of the one or more second base stations to provide at least a subset of the first set of uncertainty values to a terminal device.

According to another aspect, there is provided a non-transitory computer readable medium comprising program instructions for causing an apparatus comprised in a first base station to perform at least the following: obtain a first set of uncertainty values from one or more second base stations, wherein the first set of uncertainty values indicates, at least partly, a time synchronization accuracy associated with the one or more second base stations; select at least a subset of the one or more second base stations based at least partly on the first set of uncertainty values; and instruct the at least subset of the one or more second base stations to provide at least a subset of the first set of uncertainty values to a terminal device.

According to another aspect, there is provided a system comprising at least a terminal device, a first base station, and one or more second base stations. The first base station is configured to: obtain a first set of uncertainty values from the one or more second base stations, wherein the first set of uncertainty values is associated with the one or more second base stations; select at least a subset of the one or more second base stations based at least partly on the first set of uncertainty values; instruct the at least subset of the one or more second base stations to provide at least a subset of the first set of uncertainty values to the terminal device; and transmit a second set of uncertainty values associated with the first base station to the terminal device. The at least subset of the one or more second base stations are configured to: transmit the at least subset of the first set of uncertainty values to the terminal device. The terminal device is configured to: receive the at least subset of the first set of uncertainty values from the at least subset of the one or more second base stations; receive the second set of uncertainty values from the first base station; estimate a time synchronization accuracy associated with the first base station based at least partly on the second set of uncertainty values and one or more uncertainty factors determined by the terminal device; estimate a time synchronization accuracy associated with the at least subset of the one or more second base stations based at least partly on the at least subset of the first set of uncertainty values and the one or more uncertainty factors determined by the terminal device; select a base station from a plurality of base stations comprising the first base station and the at least subset of the one or more second base stations by comparing the estimated time synchronization accuracy associated with the first base station and the estimated time synchronization accuracy associated with the at least subset of the one or more second base stations; and synchronize a clock based on the selected base station.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
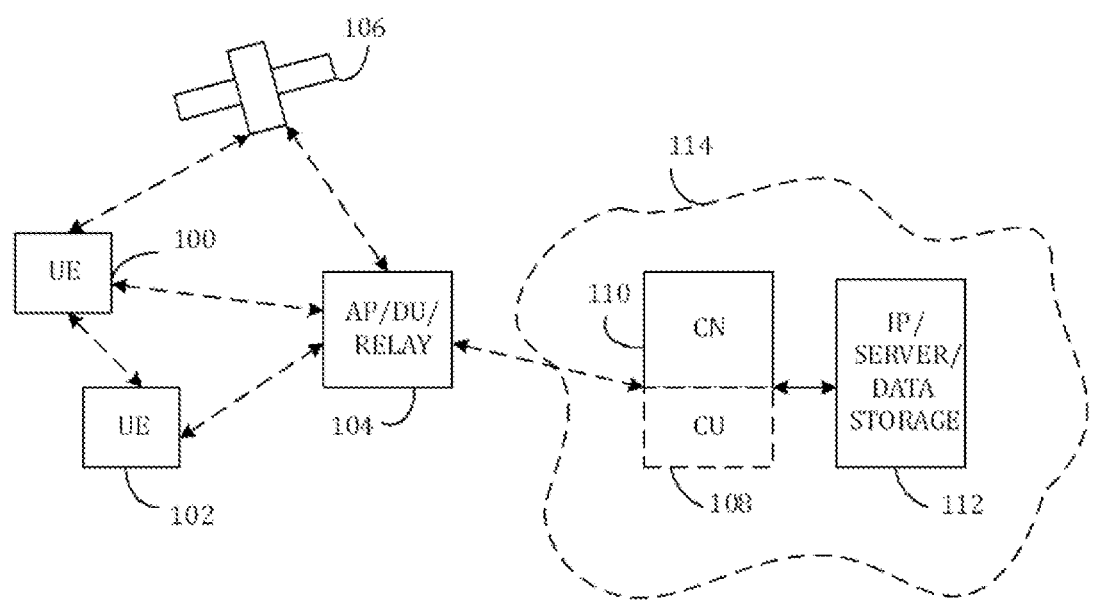
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g)NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the same infrastructure to run services that have different requirements on latency, reliability, throughput and mobility.

The current architecture in LTE networks may be fully distributed in the radio and fully centralized in the core network. The low latency applications and services in 5G may require to bring the content close to the radio which leads to local break out and multi-access edge computing (MEC). 5G may enable analytics and knowledge generation to occur at the source of the data. This approach may require leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real time functions at the RAN side (in a distributed unit, DU 104) and non-real time functions in a centralized manner (in a centralized unit, CU 108) may be enabled e.g. by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); a distributed unit (DU) that may be used for the so-called Layer 1 (L1) processing and real-time Layer 2 (L2) processing; and a centralized unit (CU) or a central unit that may be used for non-real-time L2 and Layer 3 (L3) processing. Such a split may enable the centralization of CUs relative to the cell sites and DUs, whereas DUs may be more distributed and may even remain at cell sites. The CU and DU together may also be referred to as baseband or a baseband unit (BBU). The RU and DU may also be comprised into a radio access point (RAP). Cloud computing platforms may also be used to run the CU or DU. The CU may run in a cloud computing platform (vCU, virtualized CU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be required to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Accurate time synchronization may be beneficial in order to support, for example, industrial internet of things (IoT), time-sensitive networking (TSN) and/or time-sensitive communications (TSC) applications for example in 5G. Time synchronization may ensure that different nodes of a 5G network, for example user plane function (UPF) including TSC adapters, gNB, and/or UE including TSC adapters, share substantially the same time of day (ToD) clock, such as a coordinated universal time (UTC) clock.

Due to the dynamic nature of a radio link, it may be challenging to deliver time synchronization over the Uu interface, i.e. air interface, from gNB to UE. Using the 5G NR control plane, time synchronization information, i.e. the gNB clock information, may be delivered from the gNB to the UEs that it is serving for example by using one of the following two techniques: 1) a broadcast technique, wherein the time information is encoded in a system information block type 9 (SIB9) message, or 2) a unicast technique, wherein the time information is encoded in a unicast radio resource control (RRC) message. In both techniques, the encoded time information may be the gNB's clock time that corresponds to the ending boundary of a specific radio system frame (referenceSFN), where the referenceSFN is indicated to the UE either implicitly in case of broadcast, or explicitly in case of unicast. When the UE receives the SIB9 or unicast RRC message, it associates the time information with its own referenceSFN boundary, which is aligned with the gNB's referenceSFN boundary. This way, the underlying 5G radio frame timing at the gNB and UE may be used as a common reference for delivery of the ToD clock.

A challenge in using the underlying 5G radio frame timing at the gNB and UE as a common reference for the delivery of the ToD clock may be that the radio frame boundaries, and hence the referenceSFN boundaries, at the gNB and UE may not be perfectly aligned in time with respect to one another. The downlink frame boundary at the UE may be shifted by the propagation delay, i.e. the time that it takes for a radio frame to propagate from the gNB to the UE over the air with respect to the corresponding frame boundary at the gNB. When the UE synchronizes its clock by associating the time information carried by a SIB9 or RRC message with its own referenceSFN boundary, its clock may be delayed by the propagation delay in comparison to the gNB's clock. For example, every 10 meters of distance may add approximately 33.3 nanoseconds (ns) of time error between the UE and gNB clocks due to the propagation delay. Therefore, it may be beneficial for the UE to compensate the time information received in the SIB9 or unicast RRC message for the propagation delay, for example by adding its current propagation delay estimate to the time information.

Propagation delay estimation may involve a measurement of the link delay, estimated for example from a round trip time (RTT) measurement, assuming symmetric delays in uplink and downlink. The RTT measurement may be obtained for example via the positioning framework, i.e. multi-RTT measurements, or via the UE timing advance, which is a metric of how much the UE's uplink transmission should be advanced relative to the downlink reception time. Once the RTT is obtained, an approximation of the downlink propagation delay may be obtained, for example, by dividing the RTT by two, i.e. by calculating RTT/2. However, it may suffer from inaccuracy of reference signal detection, downlink/uplink asymmetry, etc.

A 5G UE may acquire the reference time from a 5G system by receiving the ReferenceTimeInfo information element provided by SIB9 or by a unicast RRC message called DLInformationTransfer. The ReferenceTimeInfo information element comprises timing information for the 5G internal system clock used for example for time stamping. Upon receiving an SIB9 with ReferenceTimeInfo, the UE may perform the following actions: 1) calculate the reference time based on the time, timeInfoType and referenceSFN fields comprised in the ReferenceTimeInfo information element, 2) calculate the uncertainty of the reference time based on the uncertainty field comprised in the ReferenceTimeInfo information element, if an uncertainty field is included, and 3) inform the upper layers of the reference time and of the uncertainty, if the uncertainty field is included.

The referenceSFN field indicates the reference system frame number (SFN) corresponding to the reference time information. If a ReferenceTimeInfo field is received in a DLInformationTransfer message, this field indicates the SFN of the primary cell (PCell).

The time field may indicate the time reference for example with 10 ns granularity. The indicated time is referenced at the network, i.e. without compensating for radio frequency propagation delay. The indicated time in 10 ns granularity from the origin is:

$$refDays*86400*1000*100000+refSeconds*1000*100000+refMilliSeconds*100000+refTenNanoSeconds$$

where the repays field specifies the sequential number of days from the origin of the time field with day count starting at 0.

If the referenceTimeInfo field is received in a DLInformationTransfer message, the time field indicates the time at the ending boundary of the system frame indicated by referenceSFN. The UE considers this frame indicated by referenceSFN to be the frame which is nearest to the frame where the message is received, which can be either in the past or in the future.

If the referenceTimeInfo field is received in SIB9, the time field indicates the time at the SFN boundary at or immediately after the ending boundary of the system information (SI) time window in which the SIB9 is transmitted. If the referenceTimeInfo field is received in SIB9, this field is excluded when determining changes in system information, i.e. changes of time should neither result in system information change notifications nor in a modification of valueTag in SIB1.

This means that even if a UE is connected to multiple cells, when the time information is provided via unicast RRC message, the referenceSFN is the one from the PCell, and not from another cell with lower propagation delay and uncertainty, for example. In case the information is provided in SIB9, it refers to the frame boundary in the cell where the SIB9 was received.

Current and future use cases may benefit from better time synchronization accuracy from the 5G system, for example below 500 ns. Currently, UE-specific uncertainties such as propagation delay are not accounted for in the time synchronization framework. However, propagation delay may have a high impact on reference time information acquisition, for example for wide area cases such as power distribution. As mentioned previously, every 10 meters added to the distance between the UE and gNB may add approximately 33.3 ns in propagation delay, affecting the accuracy of the reference time if the propagation delay is not taken into account properly.

Currently, a UE may read time synchronization information from the active serving cell, which may be selected based on radio quality. In other words, synchronization-related conditions are not currently taken into account in cell selection. In case reference time information is delivered via unicast, it is with reference to the frame boundary of the UE's PCell. In case it is delivered via broadcast signalling, it is in reference to the frame in the cell where the information is received, and the UE may read system information from its serving cell, i.e. PCell, in case the UE is in RRC connected mode, and the serving cell when the UE is in RRC idle/inactive mode. However, the serving cell, selected for example as being the one with the best signal-to-interference-plus-noise ratio (SINR), reference signal received power (RSRP) and/or reference signal received quality (RSRQ), is not necessarily the one which enables the highest time synchronization accuracy, for example due to a large propagation delay. In other words, in order to achieve the best opportunistic synchronization performance, it may be insufficient to take into account just the cell with the best radio signal quality, the closest cell, or the cell broadcasting the lowest uncertainty.

At the moment, there may be no framework allowing the network or UE to determine if a specific UE is reading time synchronization information from the cell providing the best synchronization performance. In other words, UE-specific conditions such as propagation delay, UE movement, reference signal detection precision, timing advance (TA), etc., are not currently taken into account in selecting a cell for time synchronization. This means that the UE may be synchronizing using a sub-optimal link, because the current framework is specific to the serving cell, and does not take UE-specific uncertainties into account.

Figure 2:
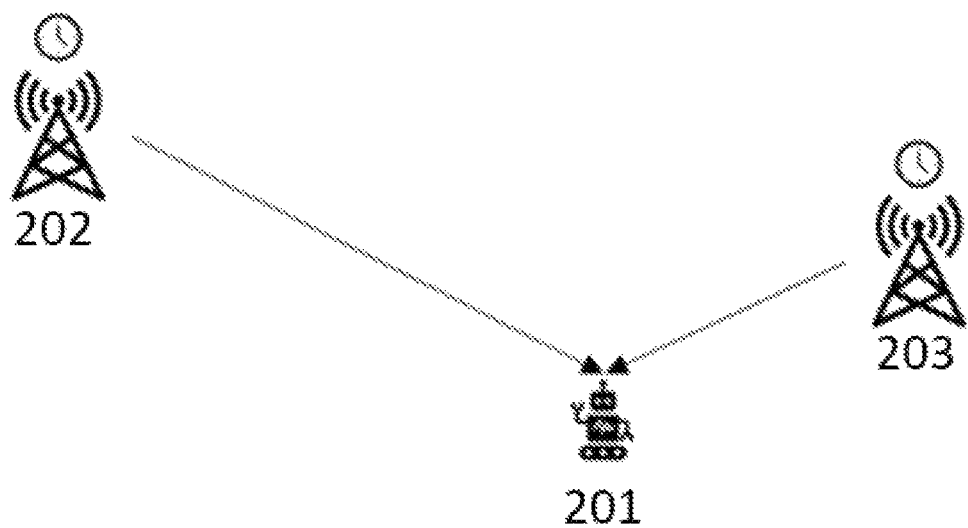
FIG. 2 illustrates an example of time synchronization.

FIG. 2 illustrates an example, wherein a UE 201 may use time synchronization information from the serving cell 202, i.e. the PCell. However, a neighbor cell 203 may possibly be a better alternative for time synchronization, if the impact of other uncertainties such as propagation delay are also considered. In other words, the propagation delay associated with the neighbor cell 203 may be smaller than the propagation delay associated with the serving cell 202.

Some exemplary embodiments provide a mechanism, in which the UE selects the optimal source for time synchronization by estimating the ReferenceTimeInfo uncertainty for some or all of the UE's neighboring cells, for example a pre-defined number of the strongest cells, or cells with SINR, RSRP and/or RSRQ above a pre-defined threshold. In addition to the cell-specific uncertainty field value indicated by different cells in their ReferenceTimeInfo, the UE takes into account also UE-specific uncertainties, such as propagation delay, when making the decision of which cell provides the best synchronization source.

Figure 3:
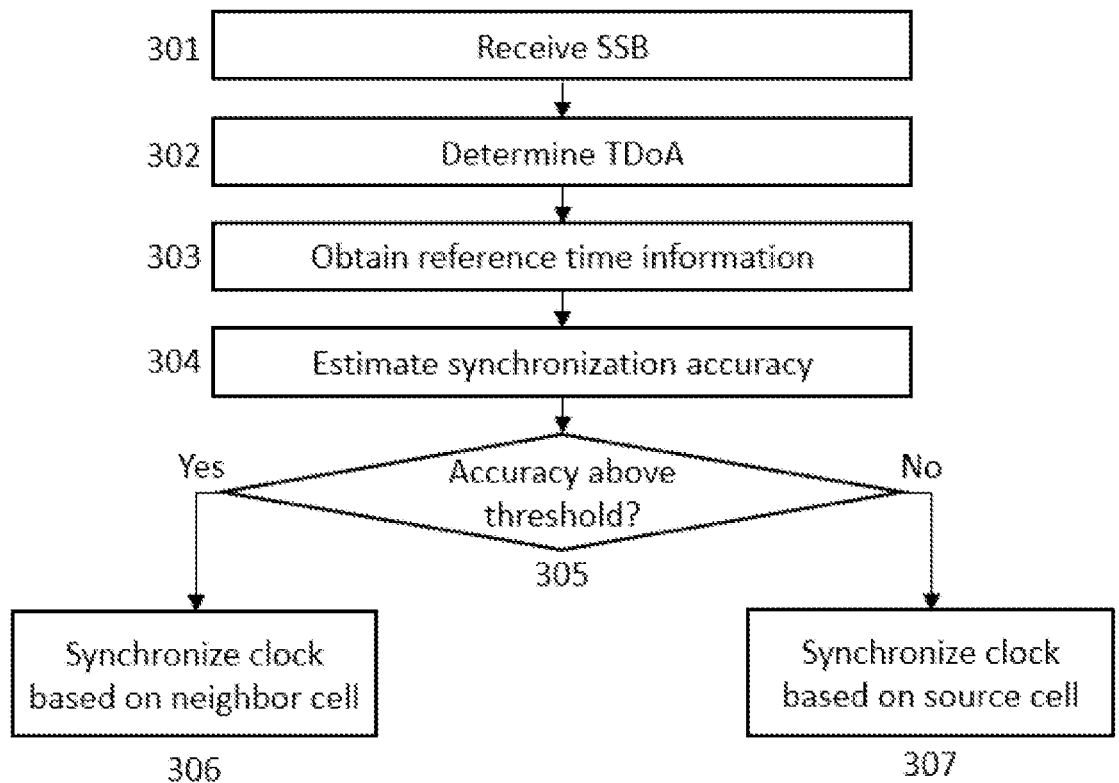
FIGS. 3 and 4 illustrate flow charts according to some exemplary embodiment.

FIG. 3 illustrates a flow chart according to an exemplary embodiment. The functions illustrated in FIG. 3 may be performed by an apparatus such as a UE, or an apparatus comprised in a UE.

Referring to FIG. 3, the UE receives 301 an SSB from a neighbor cell i, i.e. a second base station (a candidate synchronization source), as well as from the current synchronization source cell, i.e. a first base station. The UE determines 302 the time difference of arrival (TDoA) and the cell identifier associated with the neighbor cell and the current synchronization source cell, as well as other metrics such as RSRP and/or RSRQ, for example based on a reference signal provided by the neighbor cell and the current synchronization source cell. The TDoA may be estimated periodically for measuring visible neighbor cells, or the estimation may be triggered by various event(s), such as a timer expiration for example for periodic checking. Alternatively or additionally, the TDoA estimation may be triggered based on, for example, mobility related changes, such as an A3 event, i.e. when the signal quality of a neighbor cell gets better than the signal quality of the serving cell. The TDoA estimation may also be triggered when new neighbor cells are added to the monitoring list, for example when their SINR, RSRP, and/or RSRQ is above a pre-defined threshold. The TDoA estimation may also be triggered when a new neighbor cell is detected, which is delivering ReferenceTimeInfo.

The UE obtains 303 the reference time information, i.e. reads the ReferenceTimeInfo information element received from the neighbor cell and from the current synchronization source cell, in order to determine their cell-specific synchronization uncertainty. The reference time information may be provided in SIB9, which may be available whether or not the UE is connected to the cell. For a cell that the UE is connected to, the reference time information may be provided by a unicast RRC signal from the cell. From the ReferenceTimeInfo information element, the UE can extract the uncertainty field.

The UE then determines 304 an overall time synchronization accuracy associated with the neighbor cell by combining the cell-specific uncertainty information obtained from SIB9 and the uncertainty estimated based on other factors determined by the UE, for example at least one of the following: 1) the propagation delay of the neighbor cell relative to the current cell determined by comparing the TDoA of the neighbor cell and the TDoA of the current cell, 2) the bandwidth available for a downlink reference signal, the downlink subcarrier spacing (DL SCS) and the downlink signal-to-noise ratio (DL SNR), which may provide an estimate of the possible SFN boundary estimation accuracy, 3) line-of-sight and/or non-line-of-sight estimation by checking the delay spread of a downlink reference signal, 4) sub-carrier spacing (SCS) of the neighbor cell, and/or other parameters which may affect time synchronization accuracy.

For biasing the uncertainty values from the current cell and the neighbor cell, the UE may utilize a function denoted as f, which uses as input $u_0$ and $u_i$, which are the vectors of values for uncertainty sources of the current cell link and the neighbor cell i link, respectively, as well as $w_0$ and $w_i$, which are the vectors of weights for uncertainties of the serving cell link and the neighbor cell i link, respectively. The u vector values may be defined by multiple uncertainty sources, including cell-specific and UE-specific uncertainty factors, such as the cell-specific uncertainty value from the reference time information, the propagation delay of the neighbor cell relative to the current cell estimated from TDoA by the UE, as well as the SINR, RSRP and/or RSRQ measured from the neighbor cell by the UE for example as indication of the uncertainty of the TDoA estimation.

The output of the function is compared 305 with a pre-defined threshold value denoted as T, in order to decide if the UE clock should be adjusted according to the reference time information from the neighbor cell or if the UE should keep adjusting the clock according to the current synchronization source cell. As a non-limiting example, the synchronization source selection may be based on a linear combination of the cell-specific and UE-specific uncertainties, i.e. the output of the uncertainty function may be calculated for example as $w_0 u_0' - w_i u_i'$.

If the output of the function is above the pre-defined threshold T (305: yes), for example $w_0 u_0' - w_i u_i' > T$, then the neighbor cell i is selected as the synchronization source, and the UE clock is synchronized 306, or adjusted, based on the selected neighbor cell i, i.e. the second base station. It should be noted that herein synchronization refers to synchronizing the clock frequency and the timing source based on the second base station, but there may be no change of serving base station, i.e. no handover between the source cell and the neighbor cell.

On the other hand, if the output of the uncertainty function is not above the pre-defined threshold T (305: no), for example $w_0 u_0 - w_i u_i \leq T$, then the current synchronization source cell is kept as the synchronization source, and the UE clock is synchronized 307, or adjusted, based on the current source cell.

The functions and/or blocks described above by means of FIG. 3 are in no absolute chronological order, and some of them may be performed simultaneously or in an order differing from the described one. Other functions and/or blocks may also be executed between them or within them.

The vectors $u_0$ and $u_i$ may be defined for example by the propagation delay and the uncertainty values observed for the current synchronization source cell and the neighbor cell i. As a non-limiting example, the weight vectors $w_0$ and $w_i$ may be set equal to (1, 1) for the propagation delay and uncertainty values, and the value of the pre-defined threshold value may be set as T=0. In this case, if for example the uncertainty values of both cells are equal and if the propagation delay of the neighbor cell i is lower than the propagation delay of the current cell, then the UE may select the neighbor cell i as the synchronization source, i.e. the UE adopts the reference time information from the neighbor cell i.

In some exemplary embodiments, the UE may compare more than one neighbor cells with the current synchronization source cell. In this case, the UE checks if there is at least one identified neighbor cell with a better time synchronization accuracy compared to the current source cell, and selects the cell which has the highest overall time synchronization accuracy, i.e. the lowest total synchronization uncertainty. In order to synchronize to the selected cell, the UE may start estimating the SFN arrival time from the selected best neighboring cell.

Figure 4:
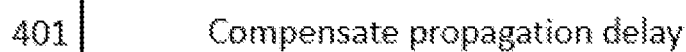

FIG. 4 illustrates a flow chart according to an exemplary embodiment, wherein the UE compensates 401 the propagation delay associated with at least a subset of the base stations. If propagation delay compensation is needed for example for the selected best neighbor cell, the UE may perform propagation delay compensation based on the propagation delay estimate from the PCell, i.e. the current synchronization source cell, added with the difference in TDoA between the current source cell and the best neighbor cell.

In another exemplary embodiment, separate thresholds may be defined for each uncertainty. For example, the UE may first compare if the propagation delay of the neighbor cell i relative to the current synchronization cell is lower than a first threshold. Then, the UE may compare if the uncertainty field of the neighbor cell i relative to the current synchronization cell is lower than a second threshold, in order to decide whether the neighbor cell i should be used as the synchronization source instead of the current synchronization cell.

In another exemplary embodiment, the UE may adjust the weights $w_0$ and $w_i$ as well as the threshold values based on a machine learning algorithm, wherein past values of uncertainties and accuracy measurements of time synchronization, for example in comparison to a reference synchronization source such as the global positioning system (GPS), may be used for a supervised learning process. Alternatively, the inference model for the decision may be provided by the network, for example by the current synchronization cell. Supervised learning is an area of machine learning that may be used for learning a function that maps an input to an output based on exemplary input-output pairs, which may be referred to as labelled training data.

Apart from the cell-specific uncertainty, the UE-specific uncertainty may depend on the reference signals in downlink used to estimate the SFN boundary reception time, and on the propagation delay estimation technique, if propagation delay compensation is used.

As an example, timing advance may be used for propagation delay estimation. The UE may be configured with a model to estimate the UE-specific uncertainty. It should be noted that the model presented in the following is just one example, and other models may be used by some exemplary embodiments. Based on this model, the UE-specific uncertainty over the air interface without propagation delay compensation may be defined for example by:

$$TE_{RAN\text{-}Not\text{-}PD\text{-}Compensated} = TE_{UE\text{-}DL\text{-}RX} + d_{PD\text{-}DL} + TE_{TAE} + TE_{TI}$$

where:

$TE_{UE\text{-}DL\text{-}RX}$ is the detection error of the downlink reference signal channel impulse response (CIR) reference point detection, for example peak detection. This may depend on the line-of-sight and non-line-of-sight conditions and the bandwidth, which dictates the resolution of the peak detection. This is a UE-specific error.

$d_{PD\text{-}DL}$ is the downlink propagation delay. This is a UE-specific error.

$TE_{TAE}$ represents the error between the gNB timestamping entity for SFN timing and the actual air interface transmission time. This is a cell-specific error.

$TE_{TI}$ is the error due to the 10 ns granularity of the timestamp in the ReferenceTimeInfo. This is a cell-specific error.

When propagation delay compensation is used, and timing advance is used to estimate the propagation delay, additional error components may also be considered. Again, the error distributions may be estimated and stored at the UE. The UE-specific uncertainty over the air interface with propagation delay compensation may be defined for example by:

$$TE_{RAN\text{-}PD\text{-}Compensated} = 1/2 TE_{UE\text{-}DL\text{-}RX} + 1/2(d_{PD\text{-}DL} - d_{PD\text{-}UL}) - 1/2 TE_{gNB\text{-}UL\text{-}RX} - 1/2 TE_{TA\text{-}err} - 1/2 TE_{TA\text{-}C} - TE_{TAE} + TE_{TI}$$

where:

$d_{PD\text{-}UL}$, is the uplink propagation delay. The uplink propagation delay and the downlink propagation delay may cancel one another in symmetric links. This is a UE-specific error.

$TE_{gNB\text{-}UL\text{-}RX}$ is the uplink reference signal accuracy. This can be estimated at the UE based on the bandwidth and the downlink reference signal at line-of-sight or non-line-of-sight. This is a UE-specific error.

$TE_{TA\text{-}err}$ is the error which is introduced when the UE applies timing advance. This is a UE-specific error as it depends on whether propagation delay compensation is used or not.

$TE_{TA\text{-}C}$ is the signaling granularity error of timing advance. This is a UE-specific error as it depends on whether propagation delay compensation is used or not.

The values of the above parameters may be estimated by the UE.

A non-limiting example application of an exemplary embodiment is presented in the following. In this example, the UE is aware of the propagation delay towards the PCell, which is 600 ns with a distance of approximately 200 meters between the UE and the PCell. The PCell broadcasts SIB9 with a 500 ns cell-specific uncertainty, not considering the air interface uncertainty. The UE determines that the downlink channel uses 30 kHz SCS and it uses the SSB and/or primary synchronization signal (PSS) for SFN boundary reception time. The UE estimates that non-line-of-sight conditions are present for example based on the delay spread. The UE estimates, for example using the model above, an air interface uncertainty of 450 ns, which gives a total UE-specific uncertainty of 950 ns for the PCell.

The UE is capable of listening to a neighbor cell, which also broadcasts SIB9. The neighbor cell's SIB9 indicates a cell-specific uncertainty of 450 ns. The UE is listening for example to the arrival time of the SSB and/or PSS reference signals, and estimates that there is a TDoA of −100 ns (a distance of approximately −33 meters) from the PCell to the neighbor cell. The SCS is 60 kHz and the neighbour cell does not provide other means to estimate the SFN boundary than SSB (similar to the PCell). Also similar to the PCell, non-line-of-sight conditions are detected. The UE estimates that the propagation delay to the neighbor cell is 600-100=500 ns, but as the PCell is using propagation delay compensation, this has no direct impact, i.e. the weight for propagation delay is zero. The UE estimates that due to the doubled SSB bandwidth, the accuracy of the downlink reference signal for SFN reception time is improved from 130 ns to 65 ns, for example. The UE therefore estimates that it will have an UE-specific uncertainty of 450 ns+(450 ns-65 ns)=835 ns for the neighbor cell.

So, even though the SIB9 cell-specific uncertainty associated with the neighbor cell is slightly higher than the PCell, the neighbor cell can still provide a UE-specific error which is 115 ns more accurate. The UE will therefore tune its oscillator to the neighbor cell instead of the source cell, i.e. the PCell. In other words, the UE selects the neighbor cell as the synchronization source in this case.

The example described above may be interpreted with the following weights for the uncertainties of the PCell and the neighbor cell: $w_0=w_1=(0, 1, 1)$, which includes the weights for propagation delay, SIB9 uncertainty and air interface, respectively. The uncertainty vectors are $u_0=(600,500,450)$ and $u_1=(500,450,385)$. Therefore, the uncertainties may be combined and compared with a threshold T=0 for synchronization source selection as follows:

$$w_0 u_0' - w_1 u_1' = (0+500+450) - (0+450+385) = 115 > 0$$

which satisfies the selection of the neighbor cell as the synchronization source.

In another non-limiting example, the UE estimates a propagation delay of 200 ns (i.e. a distance of approximately 66 meters) to the PCell, and propagation delay compensation is not used. In this case, the effect of propagation delay in the uncertainty has a weight of 1 and $w_0=w_1=(1,1,1)$. The SIB9 indicates a 500 ns cell-specific uncertainty. A neighbor cell has a TDoA of +200 ns (i.e. at a distance of approximately 66 meters), and an SIB9 indicating a cell-specific uncertainty of 300 ns. Again, SSB and/or PSS is used to estimate the SFN boundary reception time, but here the UE detects a line-of-sight scenario to the PCell and a non-line-of-sight scenario to the neighbor cell. The UE estimates the time synchronization accuracy of the PSS in the line-of-sight and non-line-of-sight scenarios to be 20 ns and 80 ns, respectively. The UE estimates the UE-specific uncertainty for the PCell to be 200 ns+500 ns+20 ns=720 ns. The UE then estimates the UE-specific uncertainty for the neighbor cell to be 400 ns+300 ns+80 ns=780 ns. In this case, the UE will not tune its oscillator to the neighbor cell, as there is no benefit in doing so, since $w_0 u_0' - w_1 u_1' = (200+500+20) - (400+300+80) = -60$, which is lower than the threshold. In other words, the UE keeps the current source cell, i.e. the PCell, as the synchronization source in this case.

In some exemplary embodiments, network-assisted synchronization source selection may be used, as described in the following.

Figure 5:
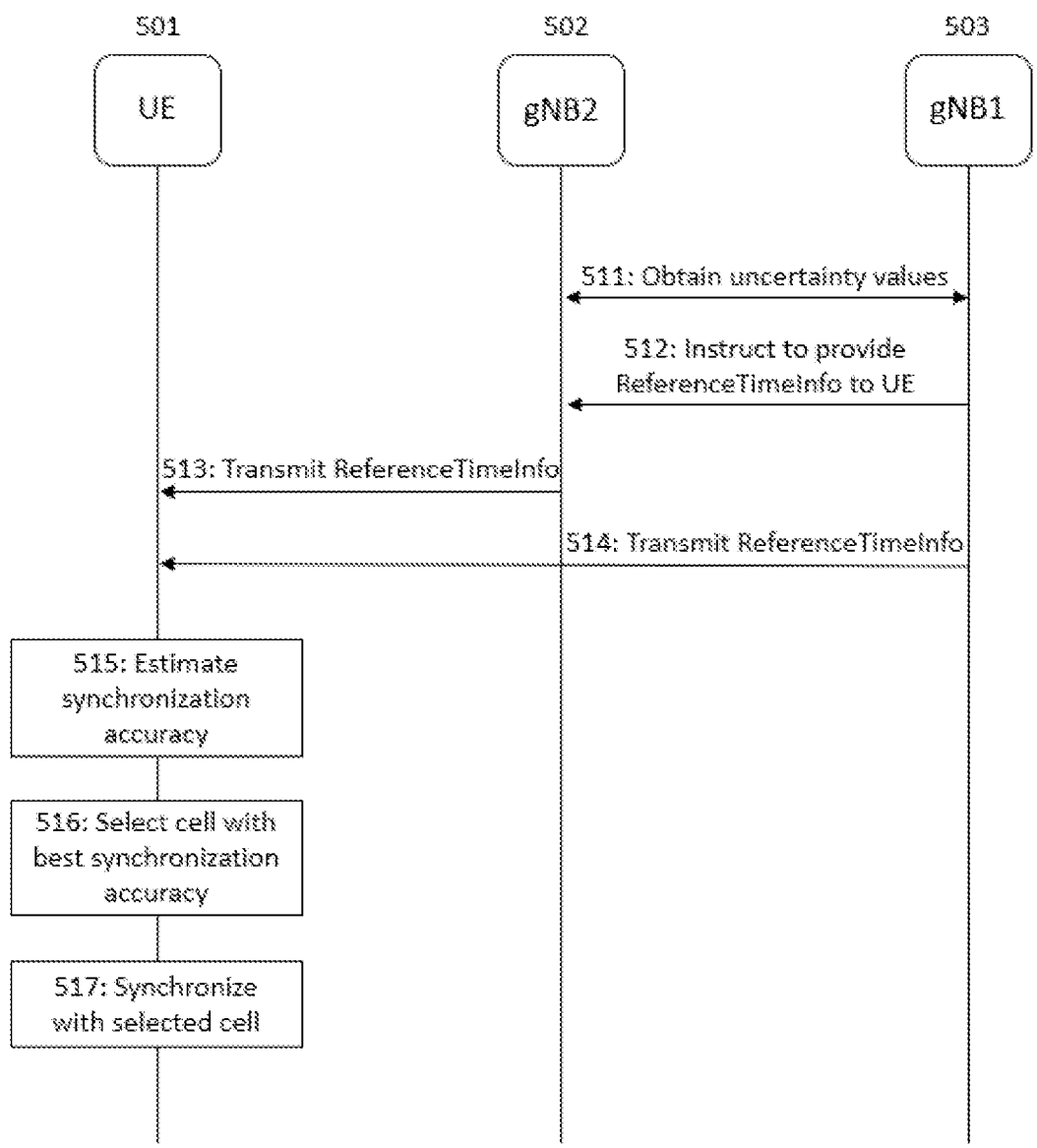
FIGS. 5-7 illustrate signalling diagrams according to some exemplary embodiments.

FIG. 5 illustrates a signalling diagram according to an exemplary embodiment. FIG. 5 illustrates the signalling between a UE 501, one or more second base stations 502 denoted as gNB2, and a first base station 503 denoted as gNB1. The one or more second base stations are associated with one or more neighbor cells of the UE, and the first base station is associated with the serving cell of the UE. The first base station is the initial synchronization source of the UE.

Referring to FIG. 5, the first base station obtains 511, or collects, a set of cell-specific uncertainty values from the one or more second base stations 502 for example via Xn or F1 interface signalling. The first base station then instructs 512, or enables, at least a subset of the one or more second base stations to provide reference time information to the UE, for example by broadcasting SIB9 or via a unicast signal to the UE, if the UE is connected to the one or more second base stations. For example, the first base station may select a subset of the one or more second base stations associated with the lowest uncertainty values, and instruct the subset of second base stations to provide the reference time information to the UE, while disabling the rest of the second base stations from providing reference time information to the UE. The at least subset of second base stations transmit 513 a first set of reference time information comprising the uncertainty values associated with the at least subset of second base stations to the UE. The first base station transmits 514 a second set of reference time information comprising the uncertainty value associated with the first base station to the UE. The UE then estimates 515 the time synchronization accuracy associated with the first base station and the at least subset of the one or more second base stations based at least partly on one or more uncertainty factors determined by the UE as well as the first set of reference time information and the second set of reference time information. The one or more uncertainty factors may indicate one or more of the following: a propagation delay, a propagation delay estimation accuracy of the UE, a receive signal quality, a receive signal power, a signal-to-interference-plus noise ratio, a receive bandwidth, movement of the UE, a reference signal accuracy, a reference signal detection precision, a timing advance, an error associated with applying the timing advance, a signalling granularity error of the timing advance, and/or a sub-carrier spacing associated with the first base station and the at least subset of the one or more second base stations. The UE compares the estimated synchronization accuracies and selects 516 the base station with the highest estimated time synchronization accuracy. The UE then synchronizes 517 its clock based on the selected base station.

Figure 6:
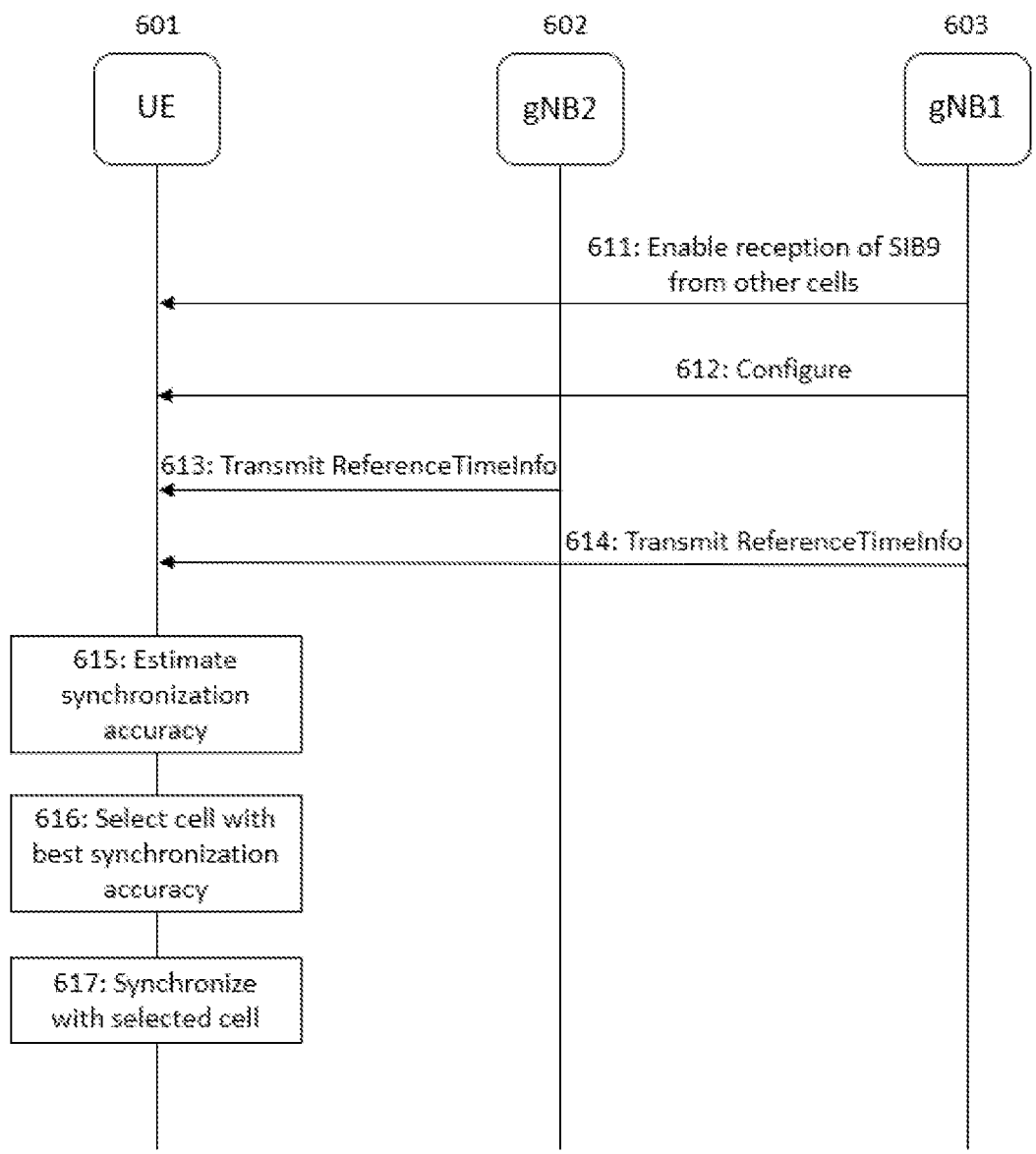

FIG. 6 illustrates a signalling diagram according to another exemplary embodiment. A first base station 603, i.e. a serving base station, instructs 611 a UE 601, for example via an RRC signal, to enable or disable reading reference signals for receiving SIB9 comprising reference time information from other cells, i.e. from one or more second base stations 602. The one or more second base stations may be a specific set of base stations defined by the first base station, or they may comprise all base stations in range of the UE. The first base station then configures 612 the UE at least with a set of selection parameters defining synchronization source selection criteria. The set of selection parameters may comprise, for example, weight factors w for weighting uncertainties, one or more threshold values, such as a propagation delay compensation threshold, and/or an inference model for synchronization source selection.

The first base station may also configure the UE with additional mobility measurement triggering parameters to consider time synchronization accuracy, for example to allow a handover to a cell with a combination of lower reference time uncertainty, lower propagation delay, etc., while maintaining a low number of radio link failures, i.e. having adequate SINR.

Furthermore, the first base station may configure the UE with additional cell reselection parameters to consider time synchronization accuracy of the neighboring cells, for example to allow the UE to select a cell with a combination of lower reference time uncertainty, lower propagation delay, etc., while maintaining a low number of radio link failures, i.e. having adequate SINR.

The one or more second base stations transmit 613 a first set of reference time information associated with the one or more second base stations to the UE. The first base station transmits 614 a second set of reference time information associated with the first base station to the UE.

The UE then estimates 615 the time synchronization accuracy associated with the first base station and the one or more second base stations based at least partly on the set of selection parameters, the first set of reference time information and the second set of reference time information. The UE compares the estimated time synchronization accuracies and selects 616 the base station with the highest estimated time synchronization accuracy. The UE then synchronizes 617 its clock based on the selected base station.

Figure 7:
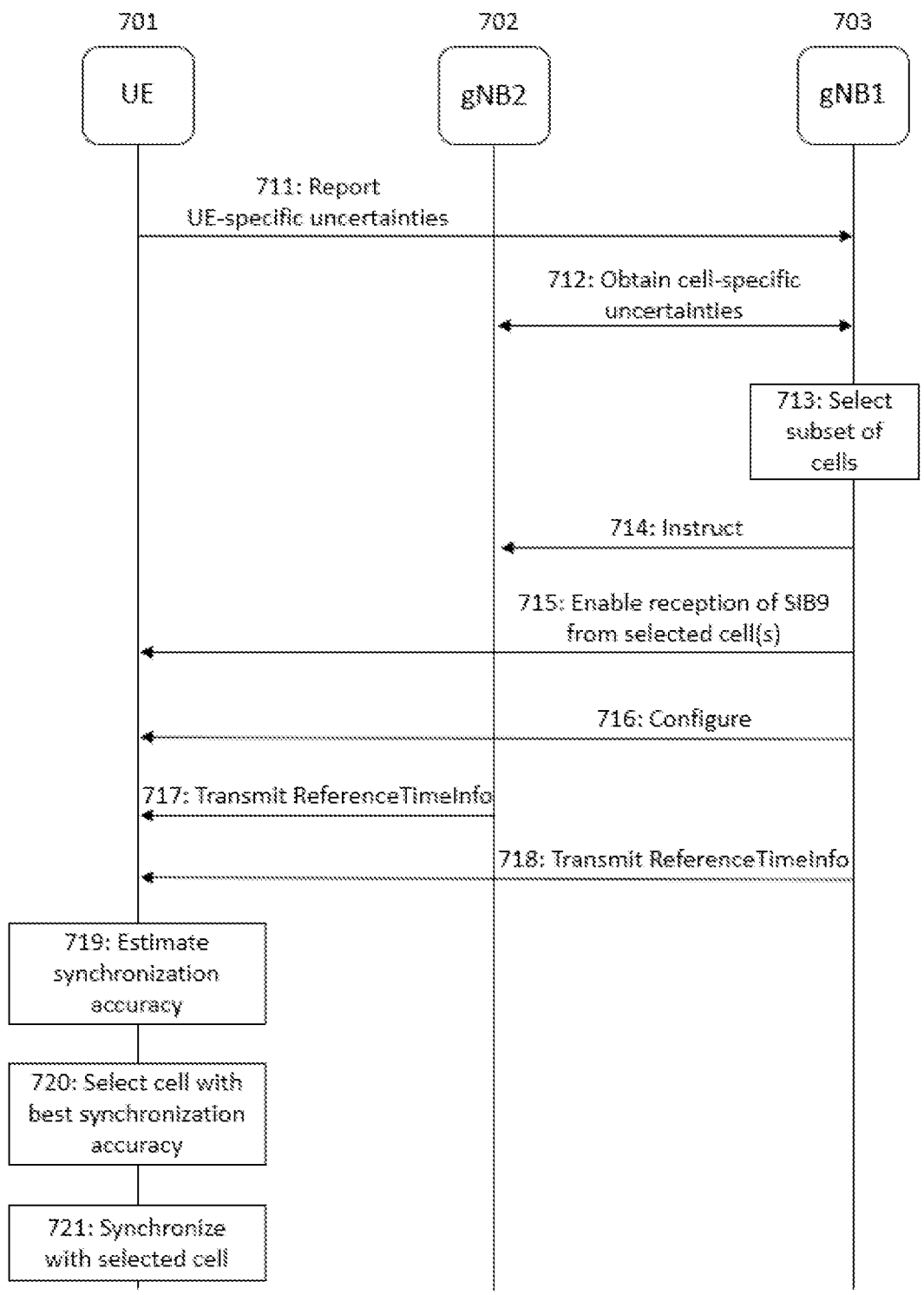

FIG. 7 illustrates a signalling diagram according to another exemplary embodiment, wherein a UE provides a report to the serving base station for assisting the serving base station with managing synchronization sources.

Referring to FIG. 7, the UE 701 transmits 711 a report to a first base station 703, i.e. the serving base station, wherein the report comprises a set of UE-specific uncertainty values associated with one or more second base stations 702 as measured by the UE. For example, the set of UE-specific uncertainty values may comprise one or more of the following: the propagation delay of the one or more second base stations relative to the first base station, i.e. the serving cell, a propagation delay estimation accuracy of the UE, a receive signal quality, a receive signal power, a signal-to-interference-plus noise ratio, a receive bandwidth, movement of the UE, a reference signal accuracy, a reference signal detection precision, a timing advance, an error associated with applying the timing advance, a signalling granularity error of the timing advance, and/or a sub-carrier spacing associated with the one or more second base stations.

The first base station obtains 712, or collects, a set of cell-specific uncertainty values from the one or more second base stations for example via Xn or F1 interface signalling.

The first base station uses the collected cell-specific uncertainty values and/or the reported UE-specific uncertainty values to manage the synchronization sources by selecting 713 a subset of the one or more second base stations that are associated with the lowest overall uncertainty, and instructing 714 the subset of second base stations to provide reference time information to the UE. The first base station may then instruct the rest of the second base stations to not provide reference time information to the UE, i.e. to disable them from providing reference time information to the UE.

The first base station may instruct the UE, for example via an RRC signal, to enable 715 reading reference signals from the subset of second base stations for receiving SIB9 comprising the cell-specific uncertainty values of the subset of second base stations.

In addition, the first base station may configure 716, or adjust, the set of selection parameters at the UE based on the cell-specific uncertainty values and/or the UE-specific uncertainty values for estimating the time synchronization accuracy associated with the subset of the one or more second base stations.

The subset of second base stations transmit 717 a first set of reference time information associated with the subset of second base stations to the UE. The first base station transmits 718 a second set of reference time information associated with the first base station to the UE.

When providing the reference time information using a unicast RRC message, if the first base station is aware of the reference time in a neighboring cell, for example if the neighboring cell is provided by the same centralized unit (gNB-CU) and/or the same distributed unit (gNB-DU) as the first base station, then the first base station may indicate that the reference time information is with respect to the frame boundary of the cell other than the UE's PCell, i.e. the first base station.

The UE then estimates 719 the time synchronization accuracy associated with the first base station and the subset of second base stations. The UE compares the estimated time synchronization accuracies and selects 720 the base station with the highest estimated time synchronization accuracy. The UE then synchronizes 721 its clock based on the selected base station.

The process illustrated in FIG. 7 may be iterative such that the first base station continuously manages the synchronization sources based on the cell-specific uncertainties and the UE-specific uncertainties, which may be received continuously at pre-defined time intervals, for example.

The functions and/or blocks described above by means of FIGS. 5-7 are in no absolute chronological order, and some of them may be performed simultaneously or in an order differing from the described one. Other functions and/or blocks may also be executed between them or within them.

In another exemplary embodiment, a base station may indicate to the UE the cell identity of the cell whose frame boundary is used for referencing the time information. This indication may be provided together with the reference time information in a unicast RRC message, for example. The indicated cell may be used as a reference instead of assuming that the PCell is used as the reference. The base station may select the best synchronization source for the UE based on its own estimation or based on a UE report received from the UE indicating the UE-specific uncertainties. The UE-specific uncertainty factors may indicate, for example, a propagation delay, a propagation delay estimation accuracy of the UE, a receive signal quality, a receive signal power, a signal-to-interference-plus noise ratio, a receive bandwidth, movement of the UE, a reference signal accuracy, a reference signal detection precision, a timing advance, an error associated with applying the timing advance, a signalling granularity error of the timing advance, and/or a sub-carrier spacing associated with one or more base stations.

A technical advantage provided by some exemplary embodiments is that they may provide a UE with more accurate and precise time synchronization by also taking into account UE-specific uncertainties, such as propagation delay, UE-specific receive signal power/quality, receive bandwidth, and/or subcarrier spacing, which may affect SFN boundary estimation accuracy. This may enable the UE to support applications such as IIoT use cases, time-sensitive networking, and/or time-sensitive communications. Herein accuracy may be related to the mean error, whereas precision may be determined by the variance of the error.

Figure 8:
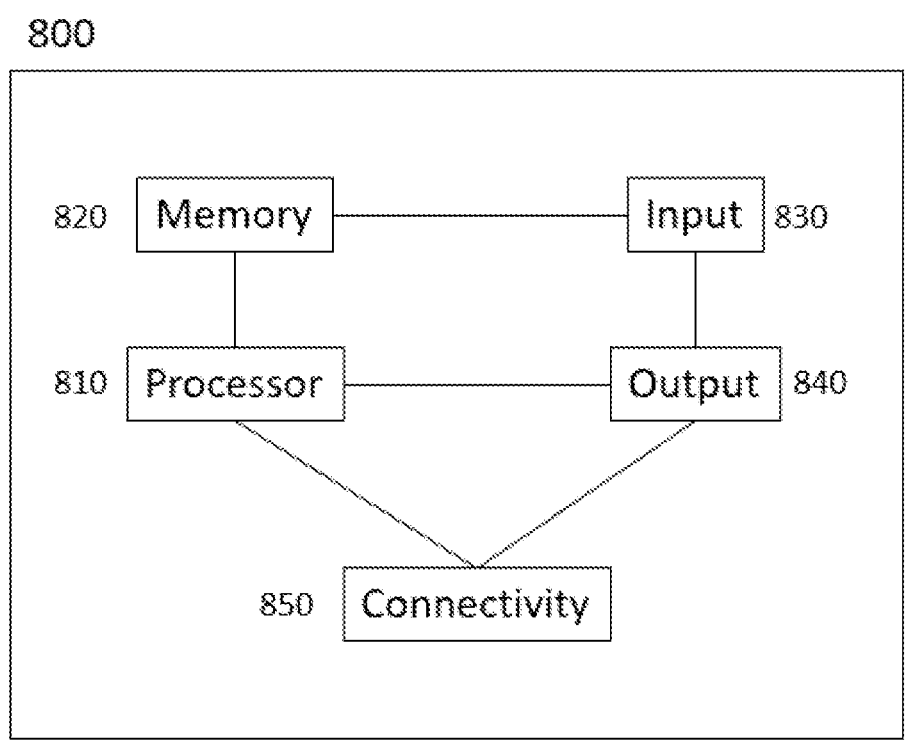
FIGS. 8-9 illustrate apparatuses according to some exemplary embodiments.

FIG. 8 illustrates an apparatus 800, which may be an apparatus such as, or comprised in, a terminal device, according to an exemplary embodiment. A terminal device may also be referred to as a UE or user equipment herein. The apparatus 800 comprises a processor 810. The processor 810 interprets computer program instructions and processes data. The processor 810 may comprise one or more programmable processors. The processor 810 may comprise programmable hardware with embedded firmware and may, alternatively or additionally, comprise one or more application specific integrated circuits, ASICs.

The processor 810 is coupled to a memory 820. The processor is configured to read and write data to and from the memory 820. The memory 820 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 820 stores computer readable instructions that are executed by the processor 810. For example, non-volatile memory stores the computer readable instructions and the processor 810 executes the instructions using volatile memory for temporary storage of data and/or instructions.

The computer readable instructions may have been pre-stored to the memory 820 or, alternatively or additionally, they may be received, by the apparatus, via an electromagnetic carrier signal and/or may be copied from a physical entity such as a computer program product. Execution of the computer readable instructions causes the apparatus 800 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 800 may further comprise, or be connected to, an input unit 830. The input unit 830 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 830 may comprise an interface to which external devices may connect to.

The apparatus 800 may also comprise an output unit 840. The output unit may comprise or be connected to one or more displays capable of rendering visual content such as a light emitting diode, LED, display, a liquid crystal display, LCD and a liquid crystal on silicon, LCoS, display. The output unit 840 may further comprise one or more audio outputs. The one or more audio outputs may be for example loudspeakers.

The apparatus 800 further comprises a connectivity unit 850. The connectivity unit 850 enables wireless connectivity to one or more external devices. The connectivity unit 850 comprises at least one transmitter and at least one receiver that may be integrated to the apparatus 800 or that the apparatus 800 may be connected to. The at least one transmitter comprises at least one transmission antenna, and the at least one receiver comprises at least one receiving antenna. The connectivity unit 850 may comprise an integrated circuit or a set of integrated circuits that provide the wireless communication capability for the apparatus 800. Alternatively, the wireless connectivity may be a hardwired application specific integrated circuit, ASIC. The connectivity unit 850 may comprise one or more components such as a power amplifier, digital front end, DFE, analog-to-digital converter, ADC, digital-to-analog converter, DAC, frequency converter, (de)modulator, and/or encoder/decoder circuitries, controlled by the corresponding controlling units.

It is to be noted that the apparatus 800 may further comprise various components not illustrated in FIG. 8. The various components may be hardware components and/or software components.

Figure 9:
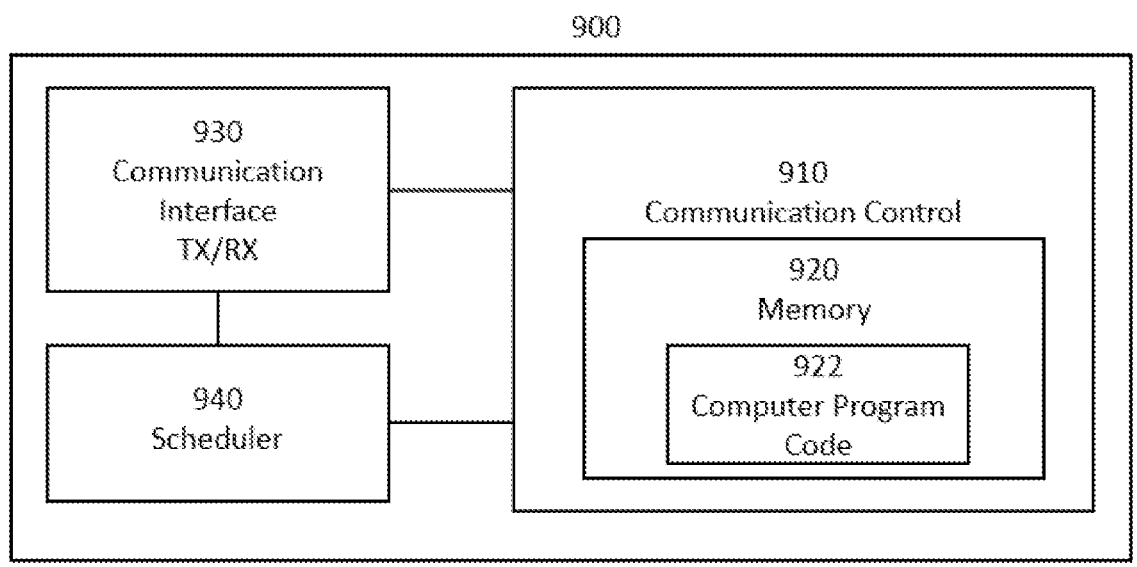

The apparatus 900 of FIG. 9 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 900 may be an electronic device comprising one or more electronic circuitries. The apparatus 900 may comprise a communication control circuitry 910 such as at least one processor, and at least one memory 920 including a computer program code (software) 922 wherein the at least one memory and the computer program code (software) 922 are configured, with the at least one processor, to cause the apparatus 900 to carry out some of the exemplary embodiments described above.

The memory 920 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 900 may further comprise a communication interface 930 comprising hardware and/or software for realizing communication connectivity according to one or more communication protocols. The communication interface 930 may provide the apparatus with radio communication capabilities to communicate in the cellular communication system. The communication interface may, for example, provide a radio interface to terminal devices. The apparatus 900 may further comprise another interface towards a core network such as the network coordinator apparatus and/or to the access nodes of the cellular communication system. The apparatus 900 may further comprise a scheduler 940 that is configured to allocate resources.

As used in this application, the term "circuitry" may refer to one or more or all of the following:
a. hardware-only circuit implementations (such as implementations in only analog and/or digital circuitry) and
b. combinations of hardware circuits and software, such as (as applicable):
   i. a combination of analog and/or digital hardware circuit(s) with software/firmware and
   ii. any portions of hardware processor(s) with software (including digital signal processor(s)), software, and memory(ies) that work together to cause an apparatus, such as a mobile phone, to perform various functions) and c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus, comprising:
at least one processor; and
at least one memory including computer program code, wherein the at least one memory and the computer program code are configured, with the at least one processor, to cause the apparatus to:
estimate a time synchronization accuracy associated with a plurality of base stations comprising at least a first base station and a second base station, wherein the time synchronization accuracy is estimated based at least partly on one or more uncertainty factors determined by the apparatus, and wherein the one or more uncertainty factors determined by the apparatus indicate at least a propagation delay associated with the plurality of base stations;
select the second base station from the plurality of base stations by comparing the estimated time synchronization accuracy associated with the plurality of base stations, wherein the estimated time synchronization accuracy associated with the second base station is higher than the estimated time synchronization accuracy associated with the first base station;
synchronize a clock based on the selected second base station; and
compensate the propagation delay associated with at least a subset of the plurality of base stations.

2. The apparatus according to claim 1, wherein the one or more uncertainty factors determined by the apparatus further indicate at least one of the following: a propagation delay estimation accuracy of the apparatus, a receive signal quality, a receive signal power, a signal-to-interference-plus noise ratio, a receive bandwidth, movement of the apparatus, a reference signal accuracy, a reference signal detection precision, a timing advance, an error associated with applying the timing advance, a signalling granularity error of the timing advance, and/or a sub-carrier spacing associated with the plurality of base stations.

3. The apparatus according to claim 1, wherein the time synchronization accuracy is estimated based partly on an uncertainty value received from the plurality of base stations.

4. The apparatus according to claim 1, wherein the time synchronization accuracy is estimated based at least partly on one or more weight factors and one or more threshold values.

5. The apparatus according to claim 1, wherein the apparatus is comprised in a terminal device.

6. A method, comprising:
estimating, by a terminal device, a time synchronization accuracy associated with a plurality of base stations comprising at least a first base station and a second base station, wherein the time synchronization accuracy is estimated by combining one or more uncertainty factors determined by the terminal device and an uncertainty value received from the plurality of base stations, and wherein the one or more uncertainty factors indicate at least a propagation delay associated with the plurality of base stations;
selecting, by the terminal device, the second base station from the plurality of base stations by comparing the estimated time synchronization accuracy associated with the plurality of base stations, wherein the estimated time synchronization accuracy associated with the second base station is higher than the estimated time synchronization accuracy associated with the first base station; and
synchronizing, by the terminal device, a clock based on the selected second base station; and
compensating, by the terminal device, a propagation delay associated with at least a subset of the plurality of base stations.

7. A computer program embodied on a non-transitory computer-readable medium, said computer program comprising instructions which, when executed on an apparatus, cause the apparatus to perform at least the following:
estimate a time synchronization accuracy associated with a plurality of base stations comprising at least a first base station and a second base station, wherein the time synchronization accuracy is estimated by combining on one or more uncertainty factors determined by the apparatus and an uncertainty value received from the plurality of base stations, and wherein the one or more uncertainty factors indicate at least a propagation delay associated with the plurality of base stations;

select the second base station from the plurality of base stations by comparing the estimated time synchronization accuracy associated with the plurality of base stations, wherein the estimated time synchronization accuracy associated with the second base station is higher than the estimated time synchronization accuracy associated with the first base station;

synchronize a clock based on the selected second base station; and compensate a propagation delay associated with at least the first base station and the second base station.

* * * * *